United States Patent [19]

Prassas et al.

[11] Patent Number: 5,069,388
[45] Date of Patent: Dec. 3, 1991

[54] POROUS PIPE LANDSCAPE SYSTEM

[75] Inventors: Thomas N. Prassas, Glendale, Ariz.; Shannon Bard, Wheeling, Ill.

[73] Assignee: Aquapore Moisture Systems, Phoenix, Ariz.

[21] Appl. No.: 491,818

[22] Filed: Mar. 12, 1990

[51] Int. Cl.[5] .............................................. A01G 27/00
[52] U.S. Cl. .................................... 239/145; 239/200; 239/272; 239/542
[58] Field of Search ................. 239/145, 200, 542, 272

[56] References Cited

U.S. PATENT DOCUMENTS 2,807,505  9/1957  Weitzel ............................... 239/145
3,908,694  9/1975  Spears ................................. 239/542
4,168,799  9/1979  Turner ................................ 239/145
4,850,531  7/1989  Littleton ............................ 239/272

Primary Examiner—Andres Kashnikow
Assistant Examiner—Lesley D. Morris
Attorney, Agent, or Firm—Marvin E. Jacobs

[57] ABSTRACT

An irrigation system that uses porous and non-porous pipe in combination, the porous pipe having a porosity such that the flow of water therethrough is balanced to the flow of water through point source emitters connected to both the porous and non-porous pipes so that simultaneous point source and line source watering is possible.

7 Claims, 1 Drawing Sheet

POROUS PIPE LANDSCAPE SYSTEM

DESCRIPTION

1. Technical Field

This invention relates to irrigation systems optimized for the efficient use of water that incorporate line source water emitters, such as porous pipe, to distribute water directly to the base of plants, or point source water emitters that operate similarly. More particularly, a combination is disclosed in which both line source and point source emitters can be combined in a single irrigation system so as to take advantage of the best characteristics of both emitters.

2. Background of the Invention

As water becomes an increasingly valuable resource, it is ever more necessary to conserve its use. Evaporation and surface runoff can waste water that should be delivered directly to plants. Two prior art systems have evolved to provide controlled irrigation to plants. Each has certain advantages in different circumstances. The first and older system uses impervious tubing, usually polyethylene, to distribute water throughout a yard or field that is to be watered. In the specific locations where water is needed, a variety of different type point source emitters may be attached to the tubing by inserting a barbed connector into a hole in the tube so as to extract water from the tube. For the purposes of this specification, point source emitters may include drip type emitters, spray heads, jet sprays, or any other low volume sprinkler head. The connector feeds water to the point source emitter which in turn drips or sprays water on the plants. The advantage of this type of emitter is that an emitter design can be selected at each location that is ideal for the specific plant or watering task at hand. For example, some emitters simply allow a controlled drip onto the ground at the base of the plant which quickly sinks in with little loss to evaporation or surface runoff. Other emitter designs offer spray patterns of various shapes and sizes that are more appropriate for other kinds of plants or arrangements of plants. Point source emitters can have different flow rates if desired, more for large plants or trees, or less for smaller plants. Thus, an irrigation system based on point source concepts may be very flexible and can be tailored with ease to the mixture of different plants in a garden.

The second system in use in the art uses porous pipe to distribute water throughout a field or garden. Water slowly leaks from the entire length of the pipe so that a line source emitter is provided that delivers an even distribution of water directly to the ground at the base of the plants with minimal loss to evaporation and runoff. The porous pipe can be formed from fabric, thermoplastic resins such as nylon or vinyl. The preferred porous pipe is made by extruding a mixture of granulated rubber and a thermoplastic binder resin such as polyethylene as disclosed in U.S. Pat. No. 4,616,055. Other thermoplastic binder resins such as vinyl can also be utilized.

The advantages of line source emitters are that they are simpler to assemble and maintain. They are durable and flexible and can even be buried underground to feed water to plant roots directly so as to totally eliminate losses to evaporation and runoff. They do not cause erosion, will not freeze, and can be fitted to follow unusual shapes. Since they do not spray, other objects are protected and splash transmitted plant diseases are prevented. Porous pipe cannot be used to irrigate plants efficiently since the water that leaks onto or into the ground between plants is wasted. The most desirable irrigation system would have all of the advantages and none of the disadvantages of both the point and line source emitter designs. The present invention provides such a system.

SUMMARY OF THE INVENTION

Briefly, the present invention includes the combination of porous pipe and impervious pipe in a single integrated irrigation system. Any combination of emitters may be used depending on the exact requirements of the watering task. Drip type point emitters may be used where spot requirements are high or spray heads employed where surface broadcasting of water is appropriate. For areas that need even surface watering, a porous pipe may be connected to the same water circuit. If a plant that grows in the middle of an otherwise even watering area needs extra water, the instant invention even allows a point source emitter to be inserted into a porous pipe line source emitter. Such combinations have not been previously possible due to the fundamentally different hydrodynamic requirements of point and line source systems and it was not known if point source emitters could be punched through porous pipe. The pores in the preferred porous pipe are formed by incomplete wetting or attachment of the polyethylene resin to the rubber particles forming serpentine-like paths through the wall of the pipe. It was not known if point source emitters could be punched-through the wall of porous pipe without cracking and/or weakening the wall of the porous pipe.

Point source emitters generally operate at pressures around 20–30 psi to insure that the emitters have predictable design flow rates and do not clog up over time with water impurities. These higher pressures are, however, incompatible with the proper operation of porous pipe, or as it is commonly called, soaker hose. Soaker hose normally operates at 5–10 psi so as to avoid uneven leakage rates along its length. At the higher pressures of 20–30 psi, the flow rate of prior art soaker hose is too great to be operated in the same water circuit with point source emitters.

This invention provides a soaker hose incorporating a smaller pore size to allow operation at the higher pressures needed to assure proper functioning of the various types of point source emitters. The details of this construction along with further advantages and benefits will become apparent from the following explanation and drawings.

DETAILED DESCRIPTION OF THE INVENTION

Figure 1:
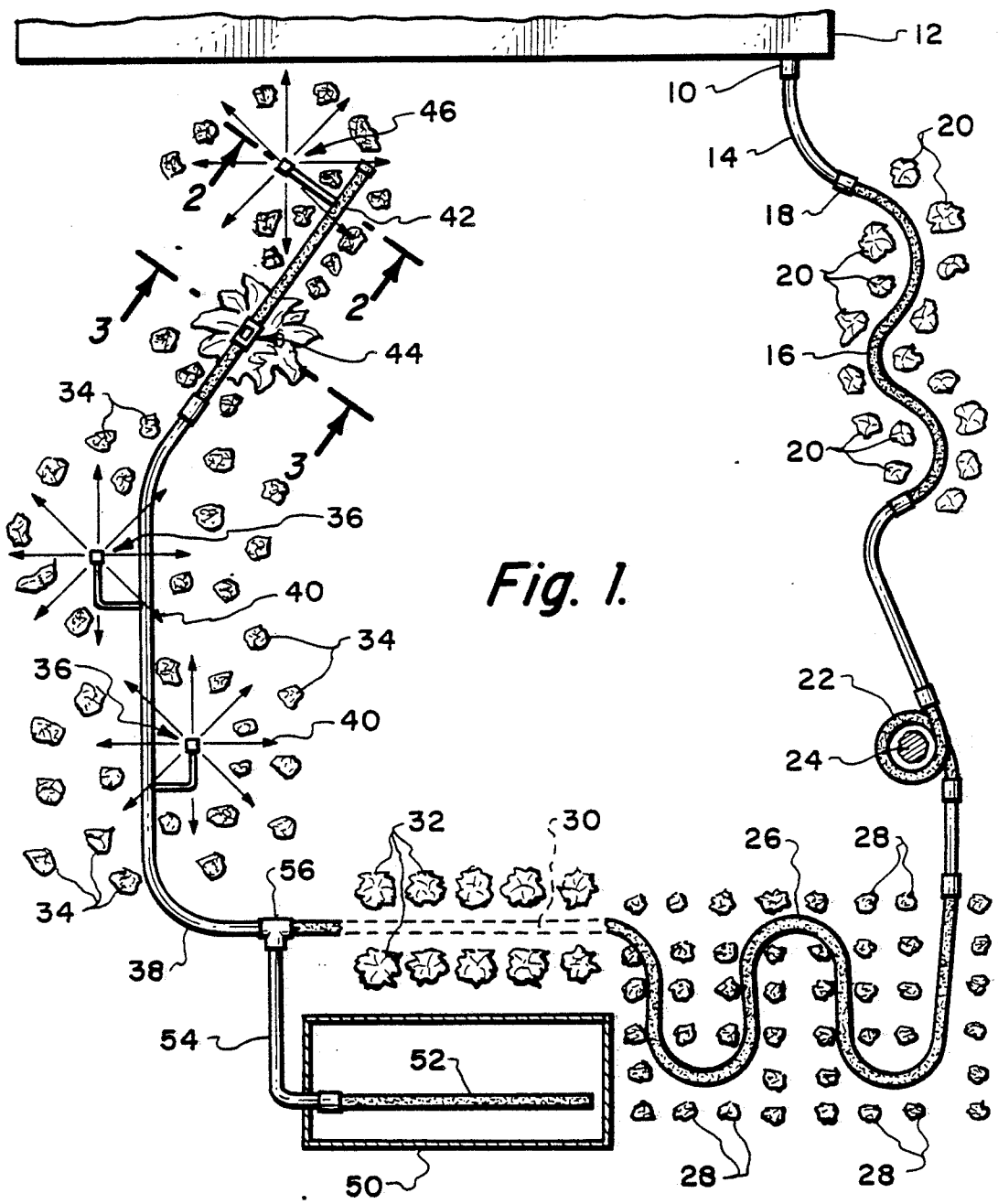
FIG. 1 shows a typical irrigation system with a wide variety of watering tasks schematically diagrammed, each task individually addressed by the selectable emitter system available through the combined point and line sources of the present invention.
Figure 2:
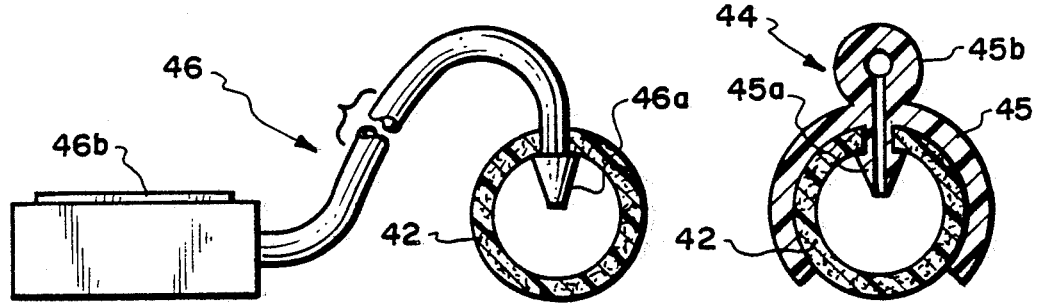
FIG. 2 is an enlarged cross-section taken along line 2—2 of FIG. 1.
Figure 3:
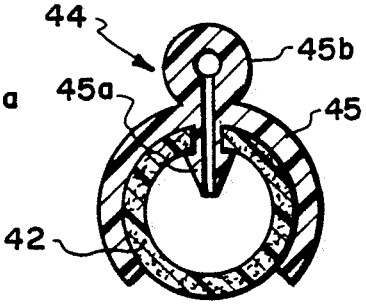
FIG. 3 is an enlarged cross-section taken along line 3—3 of FIG. 1.

In the drawing a source of water 10 is shown coming perhaps from the side of a building 12. A length of distribution tubing 14 is connected thereto in a conventional manner and also connected to a soaker hose 16 by means of a connector 18. For a grouping of plants 20 that are relatively close together, porous soaker hose 16 is an ideal solution since it can be threaded through the plantings and allowed to wet the earth over an extended area.

Another excellent use for soaker hose is to connect a short length 22 so as to wrap about a single large plant such as a tree 24. Still another segment of porous hose 26 is shown in a regular garden 28. Hose 26 may be buried underground as at 30 so as to effectively water just the roots of a row of plants 32. Some watering tasks are, however, better solved with point source emitters.

For more widely distributed plants, such as plants 34, one may use point source spray heads connected to a tube 38. Heads 36 spray water in a selected pattern as shown by exemplary arrows 40. For mixed requirements, one may even utilize both a soaker hose 42 and point source emitters 44 and 46. Emitter 44, for example, could be of the drip type that wraps around hose 42 as shown at 45 in the enlarged detail. A barbed tap 45a conveys water through a drip controller 45b. Or emitter 46 could be of the spray head type shown in the other enlarged detail where water is conveyed through a tap 46a to a spray head 46b. These point source emitters are well known to those skilled in the art but have always been useable only on high pressure tubing due to the inherently different hydrodynamic characteristics. With the instant invention it becomes possible to use point source emitters connected directly to the soaker hose itself.

The important design consideration is that the soaker hose be flow balanced to the chosen point source emitter flow rates. This should take into consideration the selected operating pressures of the point emitters. If the water flow in the porous hose is balanced to the flow in the point emitters, a combined point and line source system is possible. With respect to the above referenced U.S. Pat. No. 4,616,055, a higher pressure porous hose may be constructed in accordance with the principles of that patent by changing some of the parameters taught therein. Smaller pore size, allowing higher operating pressure, may be obtained by using a greater proportion of polyethylene, or a finer mesh of rubber, or a slower rate of extrusion. Alternatively, a combination of two or three of these techniques may be employed to achieve the balanced water flow through the porous hose and the point source emitters.

An additional benefit of the generally higher operating pressures of this combined irrigation system is a reduced sensitivity to level changes in the porous soaker hose. For example, in the drawing an elevated planting box 50 is illustrated. A porous soaker hose 52 in box 50 is connected to the main system by a tube 54 and a tee connection 56. Higher pressures permit this arrangement to work well whereas in the prior art it was unwise to have too severe a height change with a soaker hose system.

Many variations within the spirit and scope of the invention are possible, hence, we intend limitation only in accordance with the appended claims.

We claim:

1. An irrigation system operable to provide combined point source water distribution and line source water distribution comprising in combination:
   water distribution tubing;
   point source water emitters adapted to be connected to said tubing;
   porous water distribution hose, the porosity of said hose being controlled to pass water therethrough at a rate that is balanced to the rate of water flow through said point source emitters; and
   means for connecting said hose and tubing together and to suitable water sources.

2. The system of claim 1 in which said porous hose is extruded from a mixture of rubber and polyethylene materials under conditions providing reduced porosity.

3. The system of claim 1 in which said porous hose has a reduced porosity so as to be operable at a higher pressure which corresponds to the operating pressures of said point source emitters.

4. In an irrigation system operable to provide both line source water distribution and point source water distribution, the improvement comprising:
   a length of porous pipe having a porosity low enough to allow an even ad predictable water flow rate along its length at water pressures above 10 psi; and
   a line source emitter punched-through and sealingly received in the wall of the porous pipe, the porosity of said pipe being controlled to pass water therethrough at a rate that is balance to the rate of water flow through said line source emitter.

5. A pipe according to claim 4 in which the water is at a pressure from 10 to 25 psi.

6. The system of claim 3 in which said reduced porosity is chosen to facilitate operation at water pressures over 10 psi so as to permit use of said point source emitters in the same water circuit with the porous hose while still producing an even and predictable water emission rate along the length of the porous hose.

7. The system of claim 6 in which said pressures over 10 psi comprise pressures in the range of 10 to 30 psi.

* * * * *